US012776744B2

(12) United States Patent
Martin et al.

(10) Patent No.: US 12,776,744 B2
(45) Date of Patent: Oct. 27, 2026

(54) ADAPTER CLAMP FOR FACILITATING INSTALLATION OF PHOTOVOLTAIC COMPONENTS TO A CYLINDRICAL PILE

(71) Applicant: ARRAY TECH, INC., Albuquerque, NM (US)

(72) Inventors: Jose Martin, Queen Creek, AZ (US); Kevin Read, Phoenix, AZ (US); Anthony Widmer, Albuquerque, NM (US)

(73) Assignee: ARRAY TECH, INC., Albuquerque, NM (US)

( * ) Notice: Subject to any disclaimer, the term of this patent is extended or adjusted under 35 U.S.C. 154(b) by 0 days.

(21) Appl. No.: 19/349,884

(22) Filed: Oct. 3, 2025

(65) Prior Publication Data

US 2026/0100673 A1 Apr. 9, 2026

Related U.S. Application Data

(60) Provisional application No. 63/704,149, filed on Oct. 7, 2024.

(51) Int. Cl.
*H02S 20/32* (2014.01)

(52) U.S. Cl.
CPC .................................... *H02S 20/32* (2014.12)

(58) Field of Classification Search
CPC ........... H02S 20/00; H02S 20/30; H02S 20/32
See application file for complete search history.

(56) References Cited

U.S. PATENT DOCUMENTS

2015/0178115 A1 6/2015 Shiva et al.
2019/0049151 A1* 2/2019 Harris .................. F24S 25/636
2019/0292823 A1* 9/2019 Dally ...................... E05D 7/081
2021/0328322 A1 10/2021 Walker et al.
2023/0072681 A1* 3/2023 Morankar ............... F24S 40/20

FOREIGN PATENT DOCUMENTS

CN 102439787 A 5/2012
CN 221193420 U 6/2024
KR 101362434 B1 * 2/2014 ............ H10F 19/00

OTHER PUBLICATIONS

Machine translation of KR-101362434-B1, Choi Jae Hong. (Year: 2014).*
European Patent Office; International Search Report and Written Opinion issued is PCT App No. PCT/US2025/049517 dated Feb. 26, 2026; 11 pages.

* cited by examiner

*Primary Examiner* — Mayla Gonzalez Ramos
(74) *Attorney, Agent, or Firm* — MASCHOFF BRENNAN

(57) ABSTRACT

Adapter clamps and systems that include adapter clamps for facilitating installation of photovoltaic (PV) components to a cylindrical pile are provided. In one embodiment, an adapter clamp may include a first arm configured to be secured to a first side of the cylindrical pile. The first arm may have edges that are configured to create Hertzian contacts with an outer surface of the cylindrical pile, and a mounting surface configured for coupling a first PV component. The adapter clamp may include a second arm configured to be secured to a second side of the cylindrical pile. The adapter clamp may further include a fastener configured to secure the first arm to the second arm and decrease a distance therebetween in order to create a frictional attachment between the first and second arms and the cylindrical pile.

20 Claims, 17 Drawing Sheets

ADAPTER CLAMP FOR FACILITATING INSTALLATION OF PHOTOVOLTAIC COMPONENTS TO A CYLINDRICAL PILE

CROSS-REFERENCE TO RELATED APPLICATION

This application claims priority under 35 U.S.C. § 119 to U.S. Provisional Application No. 63/704,149, filed Oct. 7, 2024, the entire disclosure of which is incorporated herein by reference.

TECHNICAL FIELD

The present disclosure relates to clamps that facilitate installation of photovoltaic (PV) components to cylindrical piles.

BACKGROUND

In photovoltaic (PV) systems, solar panels are secured to torque tubes that extend in long rows. Torque tubes are then secured to piles, or posts, that are anchored in the ground. The piles to which torque tubes are secured may have a number of different cross-sectional sizes and shapes, including circular, oval, and I-shaped. In order to secure torque tubes to piles, any number of different brackets, adapters, and interfaces may be used. These components must be capable of withstanding a significant amount of force without slipping or breaking loose from the piles, as the weight of the solar panels and environmental forces such as wind, snow, and seismic activities are significant.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used to limit the scope of the claimed subject matter.

Exemplary embodiments of the present disclosure address problems experienced in conventional pile adapters. Specifically, the pile adapters of the present disclosure are configured to be mounted on cylindrical piles in a way that allows the pile adapters to be positioned at different locations on the pile. For example, during installation, the pile adapters of the present disclosure may be positioned at a desired location both vertically and rotationally on the pile. This variability ensures that the PV components secured to the adapters are properly aligned with other components in the PV system. In addition, pile adapters of the present disclosure are capable of withstanding a significant amount of force without slipping or breaking loose from the piles.

The object and advantages of the embodiments will be realized and achieved at least by the elements, features, and combinations particularly pointed out in the claims. Both the foregoing summary and the following detailed description are exemplary and explanatory and are not restrictive.

BRIEF DESCRIPTION OF THE DRAWINGS

Example embodiments will be described and explained with additional specificity and detail through the accompanying drawings in which.

DETAILED DESCRIPTION

Embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Photovoltaic (PV) installations often include a large number of PV modules that are secured to torque tubes in long rows. To anchor the torque tubes to the ground, a number of different brackets, adapters, and interfaces may be used. For example, pile adapters may provide a mounting surface to which components of the PV installation may be secured. Piles used in PV installations can have any number of different sizes and cross-sectional shapes. For example, some piles have I-shaped cross-sectional shapes. Other piles have circular, oval, or square cross-sectional shapes. In addition to being compatible with whatever the shape and size of the pile, adapters are also specifically designed to withstand significant forces that are caused by the weight of the attached PV components, as well as environmental forces such as wind, snow accumulation, and seismic activities.

Figure 1B:
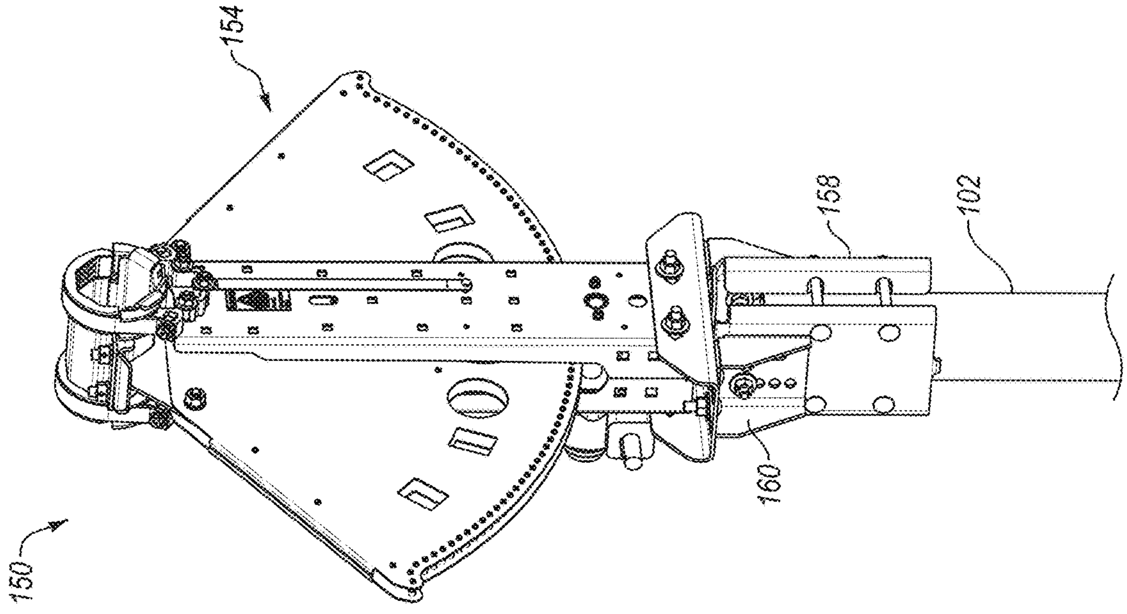
FIG. 1A-1B illustrates systems for facilitating installation of photovoltaic (PV) components to a cylindrical pile according to embodiments of the present disclosure.
Figure 1A:
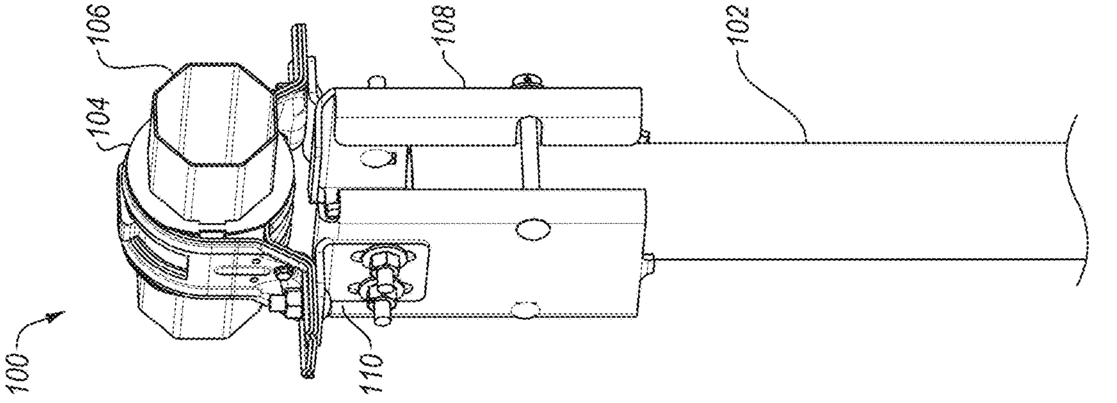

FIG. 1A illustrates a system 100 for facilitating installation of PV components to a cylindrical pile 102 according to a first example embodiment of the present disclosure. The cylindrical pile 102 may have a round or oval cross-sectional shape. In the system 100, the PV component to which the cylindrical pile is secured is a torque tube interface 104, that is rotationally coupled to a torque tube 106. Any number of PV modules may be attached to the torque tube 106. An adapter clamp 108 is secured to the pile 102. The adapter clamp 108 provides a mounting surface to which a bracket 110 is secured. The torque tube interface 104 is mounted to the bracket 110 to secure the torque tube 106 to the pile 102.

Adapter clamps may be used to secure any number of different PV components to cylindrical piles. For example, FIG. 1B illustrates a system 150 for facilitating installation of PV components to a cylindrical pile according to another example embodiment of the present disclosure. Like the system 100, the system 150 includes the cylindrical pile 102, which may have a round or oval cross-sectional shape. In the system 150, the PV component is a tracker motor and gear 154, which may be configured to rotate an attached torque tube (not shown) so that PV modules coupled to the torque tube may track a position of the Sun in the sky throughout the day. An adapter clamp 158 is secured to the pile 102 and provides a mounting surface to which a bracket 160 is secured. The tracker motor and gear 154 is mounted to the bracket 160.

Many currently available adapters for cylindrical piles suffer from a number of different deficiencies. First, many current adapters are unable to withstand forces and fail due to the weight of the attached components or environmental forces. The structural integrity of some adapters may be reduced if the adapter is not positioned properly on a pile. For example, if an adapter is not aligned with the vertical axis of a cylindrical post to which it is attached, the structural integrity of the adapter or its connection to the pile may be compromised. In addition, if the spacing of components of an adapter are not positioned on opposite sides of a cylindrical pile, this too may compromise the structural integrity of the adapter or its connection to the pile.

In addition, many current adapters have prescribed locations, such as mounting holes, on the piles to which they are secured. These prescribed locations prevent the adapters from being selectively positioned either vertically (up and down on the pile) or rotationally (at different angular positions) on the pile. Having some ability to selectively position an adapter on a pile may be important to ensure that PV components that are attached to the adapters are in alignment.

Adapter clamps of the present disclosure resolve these issues. Adapter clamps of the present disclosure provide sufficient strength to withstand forces that are caused by the weight of the attached PV components and environmental forces. Adapter clamps of the present disclosure are also versatile as they may be selectively positioned both vertically and rotationally on cylindrical piles.

Adapter clamps of the present disclosure may be constructed from any number of different materials, including metal. In addition, as provided in more detail below, adapter clamps of the present disclosure may be made from a single unitary piece of material, such as metal, and bent or folded into the final form of the clamp.

Figure 2A:
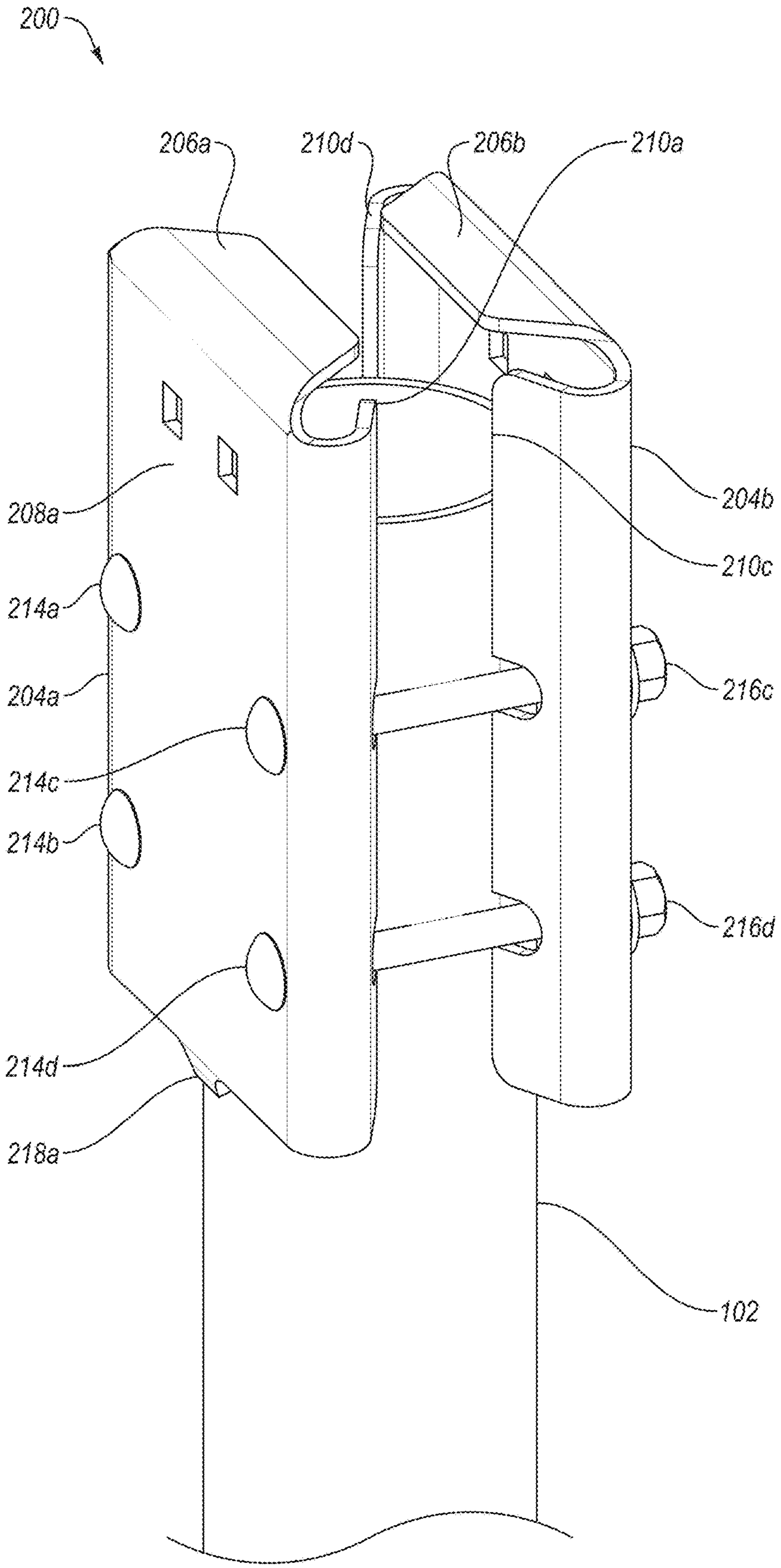
FIGS. 2A-2H illustrate one embodiment of an adapter clamp for facilitating installation of PV components to a cylindrical pile according to the present disclosure.
Figure 2B:
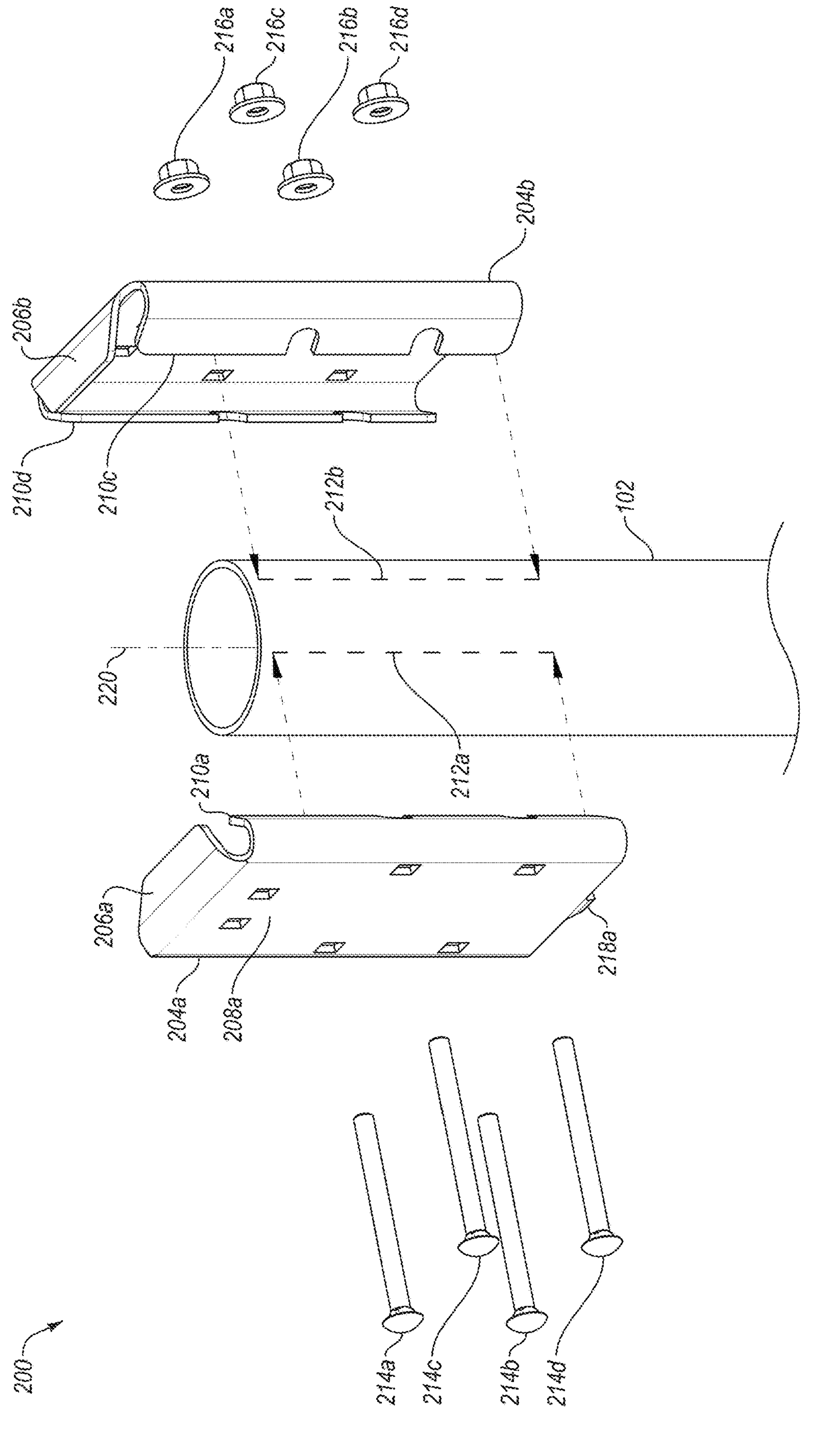
Figure 2C:
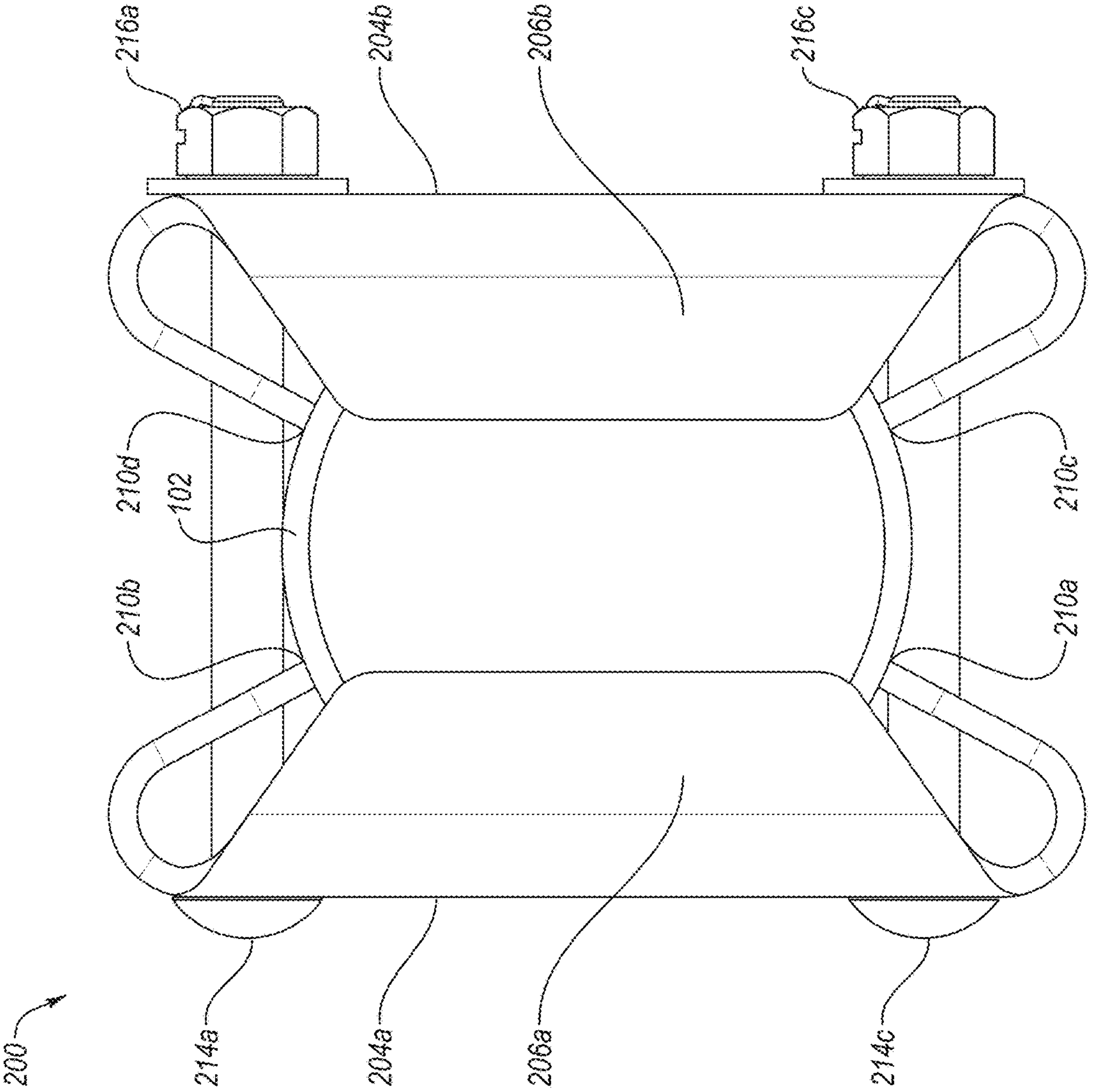
Figure 2E:
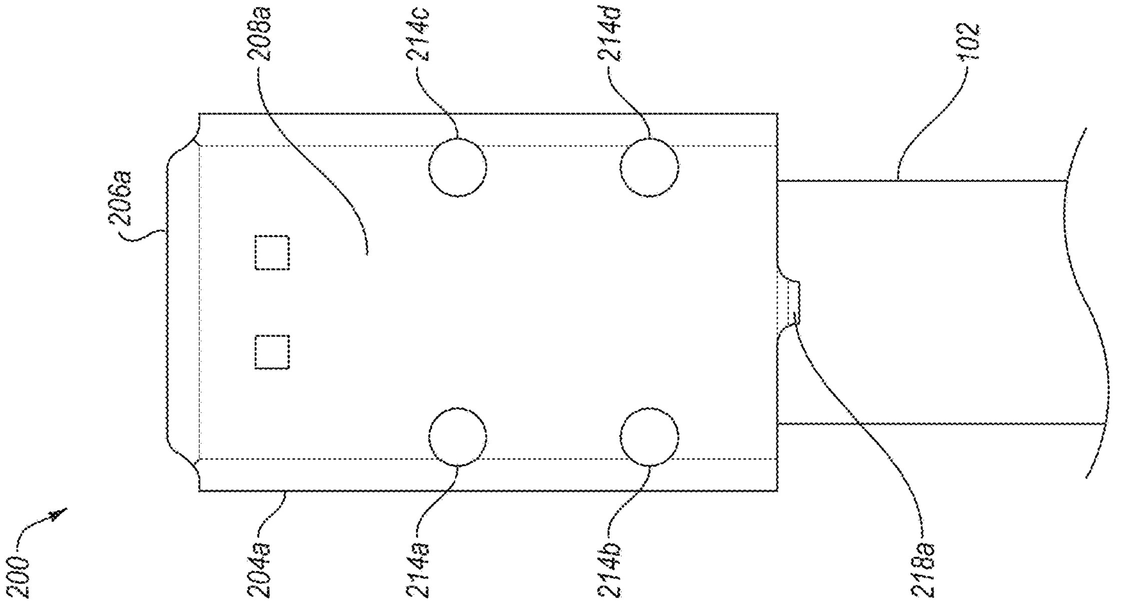
Figure 2D:
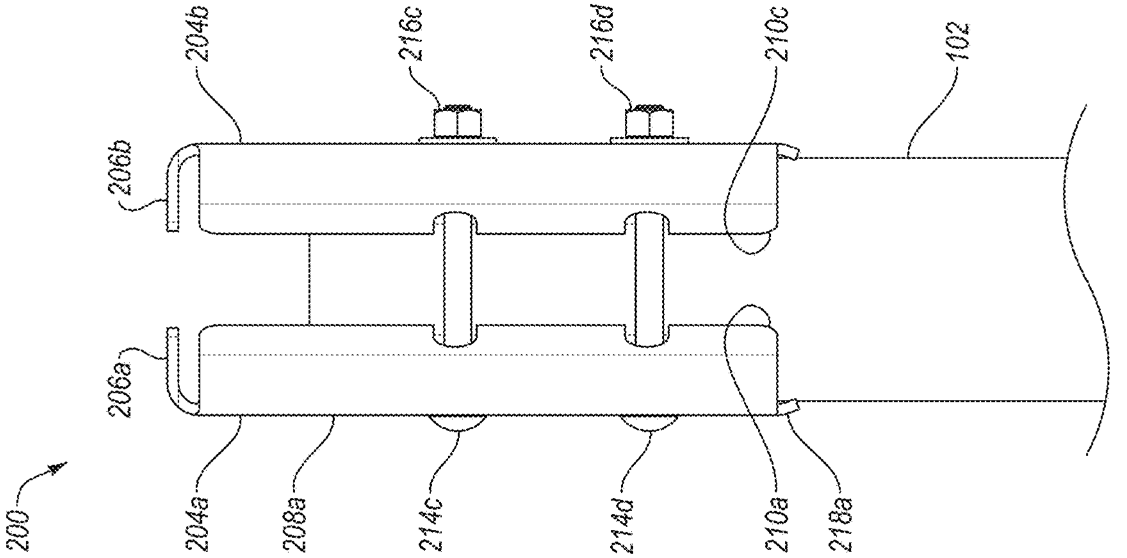
Figure 2H:
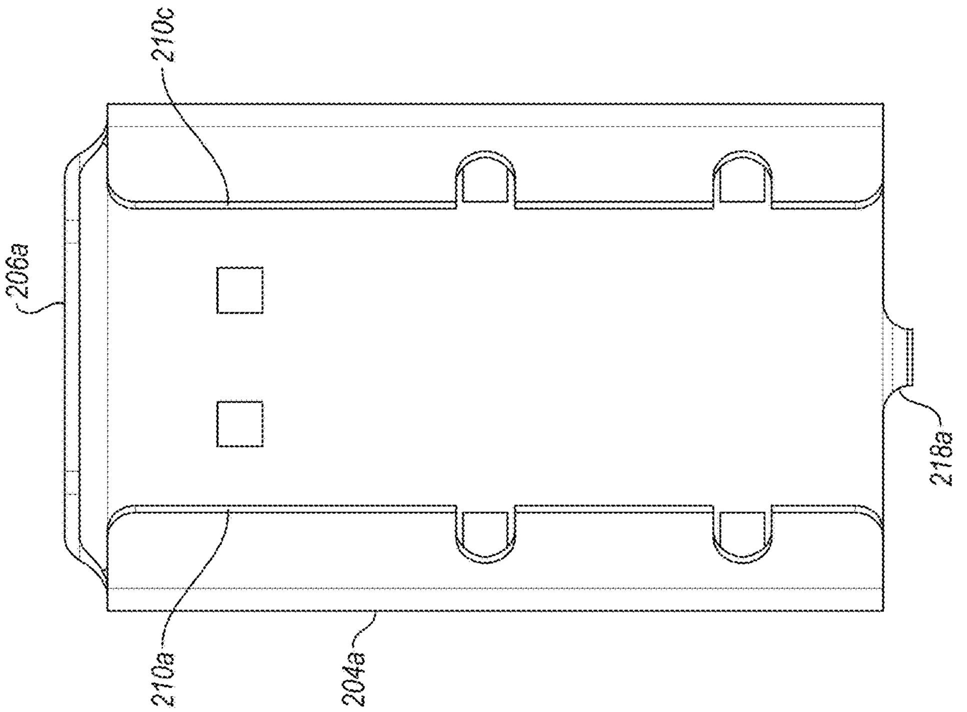
Figure 2G:
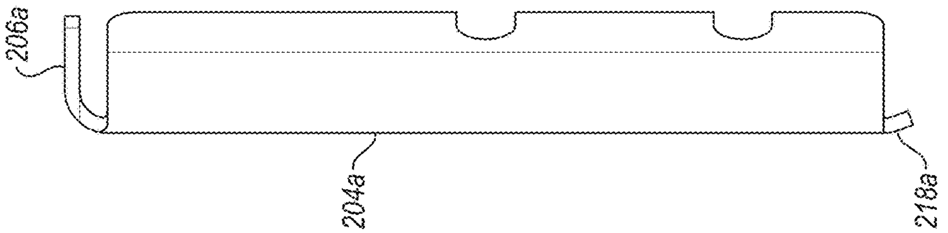
Figure 2F:
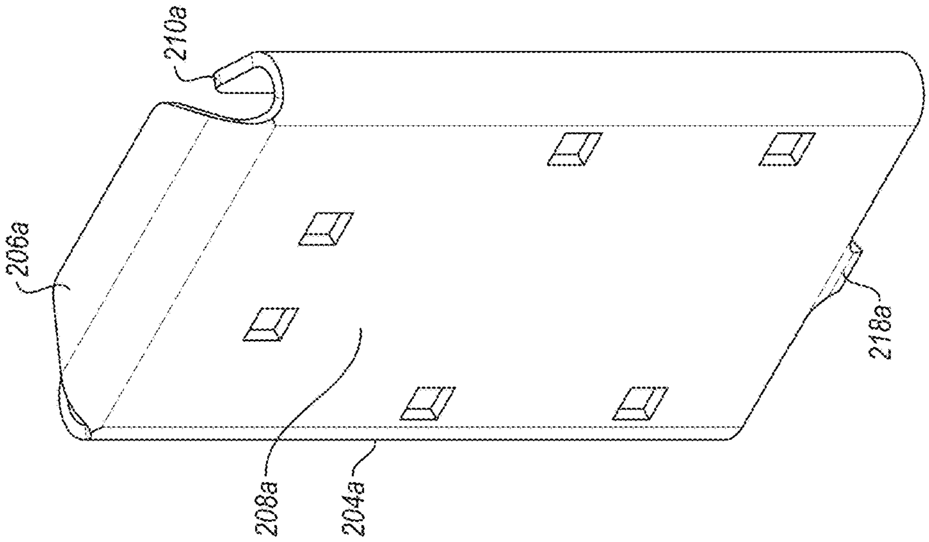

FIGS. 2A-2H illustrate one embodiment of an adapter clamp 200 for facilitating installation of PV components to the cylindrical pile 102 according to the present disclosure. FIG. 2A illustrates a perspective view of the adapter clamp 200 mounted to the cylindrical pile 102. FIG. 2B illustrates an exploded view of the adapter clamp 200 and cylindrical pile 102. FIG. 2C illustrates a top down view of the adapter clamp 200 and the cylindrical pile 102. FIG. 2D illustrates a first side view of the adapter clamp 200 and cylindrical pile 102. FIG. 2E illustrates a second side view of the adapter clamp 200 and cylindrical pile 102. FIGS. 2F-2H illustrate additional views of a portion of the adapter clamp 200.

The adapter clamp 200 includes a first arm 204*a* and a second arm 204*b*. The first and second arms 204*a* and 204*b* extend down portions of opposing lateral sides of the cylindrical pile 102. The first and second arms 204*a* and 204*b* may be identical or substantially identical to each other. For example, the first and second arms 204*a* and 204*b* each include a top surface 206*a* and 206*b*. The first and second arms 204*a* and 204*b* each include a mounting surface 208*a* and 208*b* for coupling PV components. The mounting surfaces 208*a* and 208*b* may include holes or other features that facilitate the mounting of additional components, such as the brackets 110 and 160 illustrated in FIGS. 1A and 1B.

The first arm 204*a* includes a first edge 210*a* and a second edge 210*b* that are curved inward toward the cylindrical pile 102. The first and second edges 210*a* and 210*b* are machined or cut edges and interface with the outer surface of the cylindrical pile 102 to create Hertzian contacts with the cylindrical pile 102. As used herein, a Hertzian contact is a non-adhesive contact between two surfaces that create a frictional attachment when the two surfaces come into contact under load. For example, the first edge 210*a* creates a Hertzian contact 212*a* with the cylindrical pile 102. The second arm 204*b* includes a third edge 210*c* and a fourth edge 210*d* that are also curved inward toward the cylindrical pile 102. The third and fourth edges 210*c* and 210*d* are machined or cut edges and interface with the outer surface of the cylindrical pile 102 to create Hertzian contacts with the cylindrical pile 102. For example, the third edge 210*c* creates a Hertzian contact 212*b* with the cylindrical pile 102. These Hertzian contacts 212*a* and 212*b* are substantially linear, as can be seen in FIG. 2B. In other embodiments, Hertzian contacts may include one or more points or curved lines of contact.

Pressure or force applied by the first, second, third, and fourth edges 210*a*, 210*b*, 210*c*, and 210*d* to the outer surface of the cylindrical pile 102 at the Hertzian contacts 212*a* and 212*b* create a frictional attachment between the first and second arms 204*a* and 204*b* and the cylindrical pile 102. The pressure necessary to create this frictional attachment may be created by bolts 214*a*, 214*b*, 214*c*, and 214*d* and associated nuts 216*a*, 216*b*, 216*c*, and 216*d*. The bolts may pass through holes or recesses in the first and second arms 204*a* and 204*b*.

As the nuts 216*a*, 216*b*, 216*c*, and 216*d* are tightened on the bolts 214*a*, 214*b*, 214*c*, and 214*d*, a distance between the first and second arms 204*a* and 204*b* may be decreased to strengthen the frictional attachment to the cylindrical pile 102. In different embodiments, different fasteners may be used to secure the first and second arms 204*a* and 204*b* to the cylindrical piles. For example, in some embodiments a U-bolt may be used.

Because the attachment between the adapter clamp 200 and the cylindrical pile 102 does not use prescribed attachment locations, such as holes or other mounting features in the cylindrical pile 102, the adapter clamp 200 is versatile as it may be selectively positioned both vertically and rotationally on the cylindrical pile 102. This versatility may ensure that components secured to the cylindrical pile, such as torque tubes, are properly positioned and in alignment with other components of the PV system.

In addition, once the first and second arms 204*a* and 204*b* are secured to the cylindrical pile 102, the Hertzian contacts 212*a* and 212*b* are parallel or approximately parallel with an axis 220 (shown in FIG. 2B) of the cylindrical pile 102. In other words, the shapes of the first and second arms 204*a* and 204*b* and their connection mechanisms ensure that these components are secured to the cylindrical pile 102 such that the hertzian contacts 212*a* and 212*b* do not deviate with any significance from parallel with the axis 220. This ensures that the structural integrity of an adapter (or its connection to a cylindrical pile) is not sacrificed due to a misalignment of components.

The shapes of the first and second arms 204*a* and 204*b* and their connection mechanisms also ensure that, when they are secured to the cylindrical pile 102, they will be aligned on opposite sides of the cylindrical pile 102. In other words, the shapes of the first and second arms 204*a* and 204*b* and their connection mechanisms ensure that when installed they will be positioned on opposite sides of the cylindrical pile 102. This also ensures that the structural integrity of an adapter (or its connection to a cylindrical pile) is not sacrificed due to a misalignment of components.

The first and second arms 204*a* and 204*b* also include vertical lock tabs 218*a* and 218*b*. The vertical lock tabs 218*a* and 218*b* are angled inward toward the cylindrical pile and are positioned on the bottom of the first and second arms 204*a* and 204*b*. The vertical lock tabs 218*a* and 218*b* may further prevent vertical and/or rotational movement of the adapter clamp 200 relative to the cylindrical pile 102.

Figure 3A:
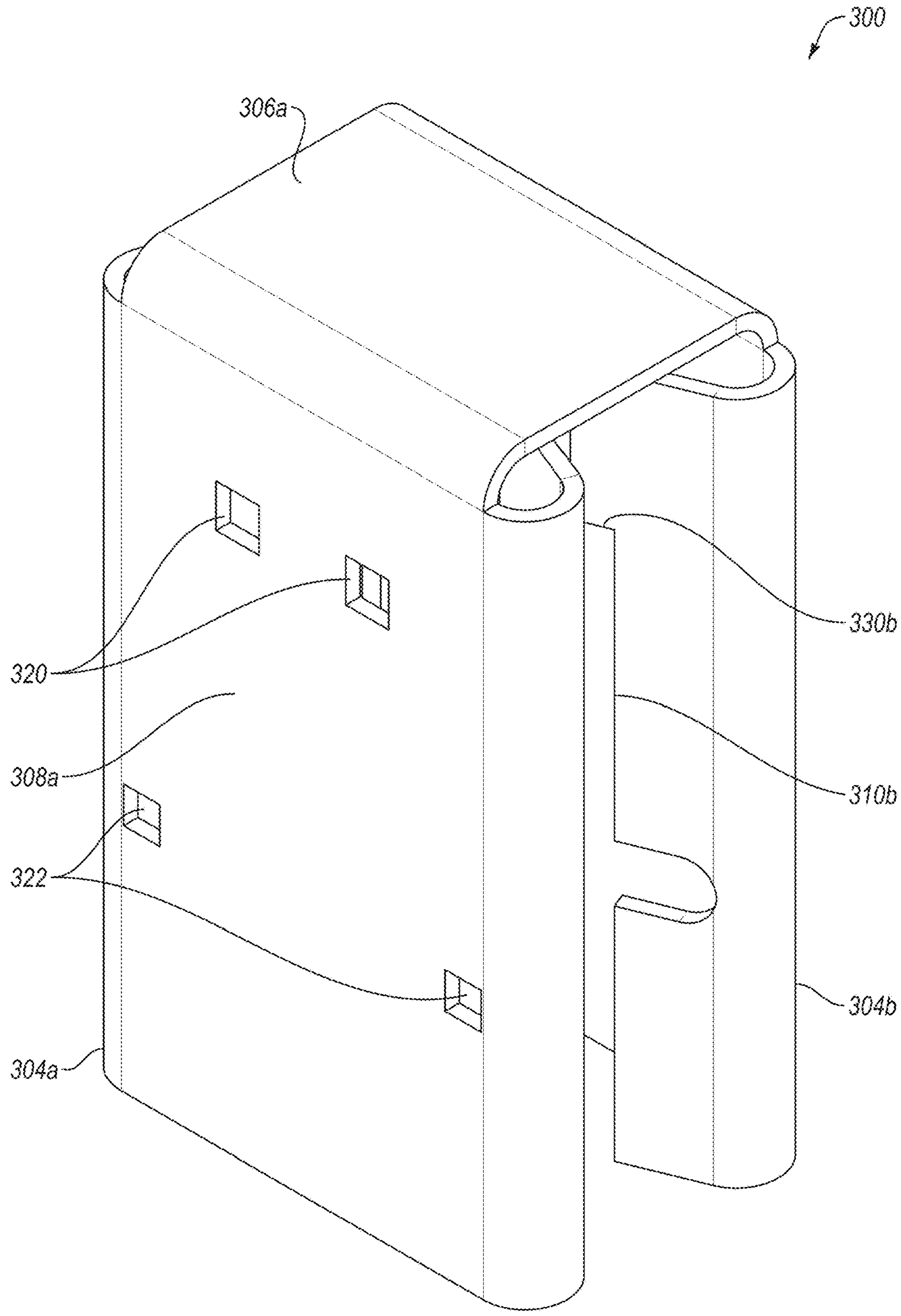
FIGS. 3A-3C illustrate another embodiment of an adapter clamp for facilitating installation of PV components to a cylindrical pile according to the present disclosure.
Figure 3B:
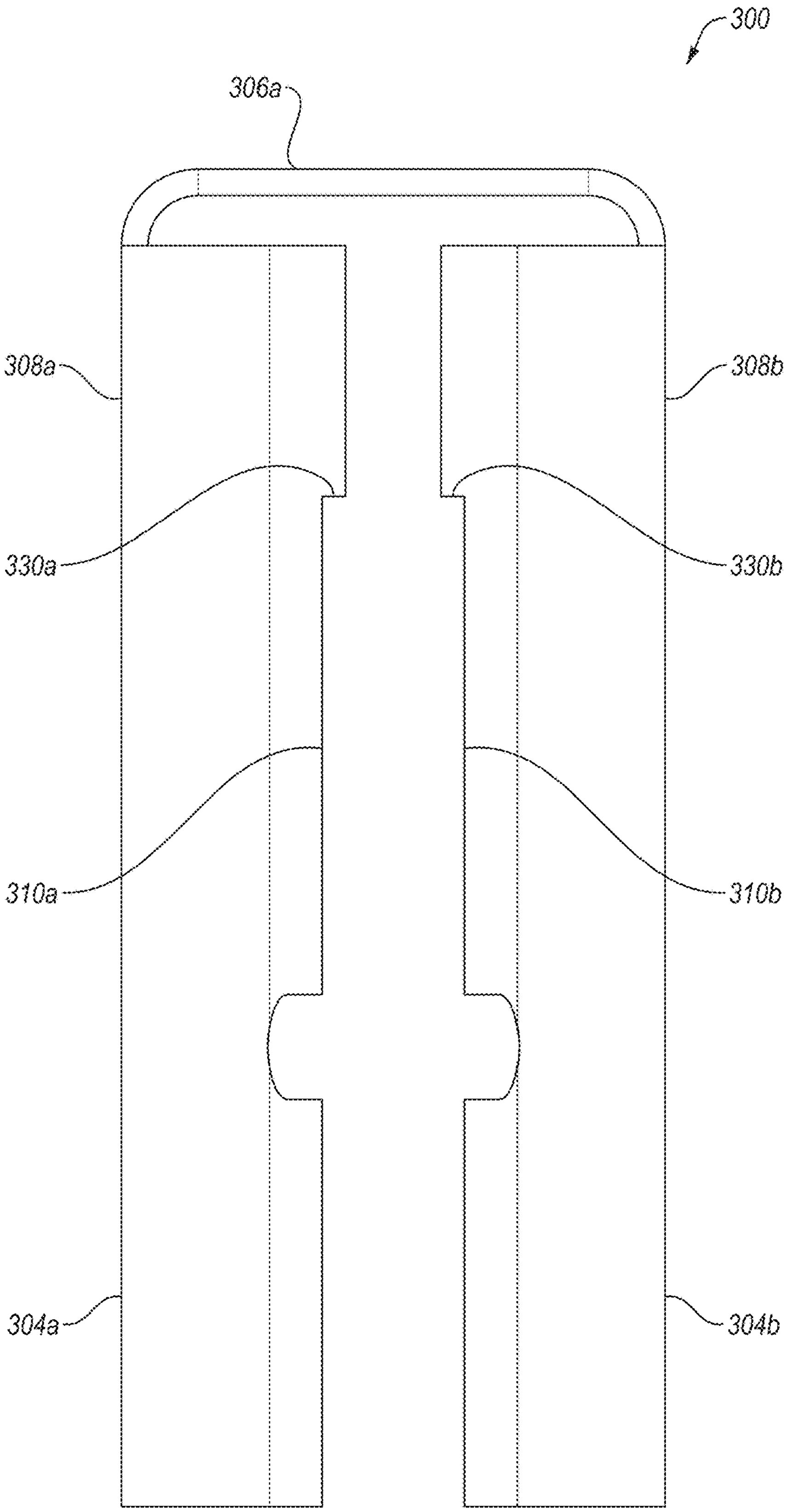
Figure 3C:
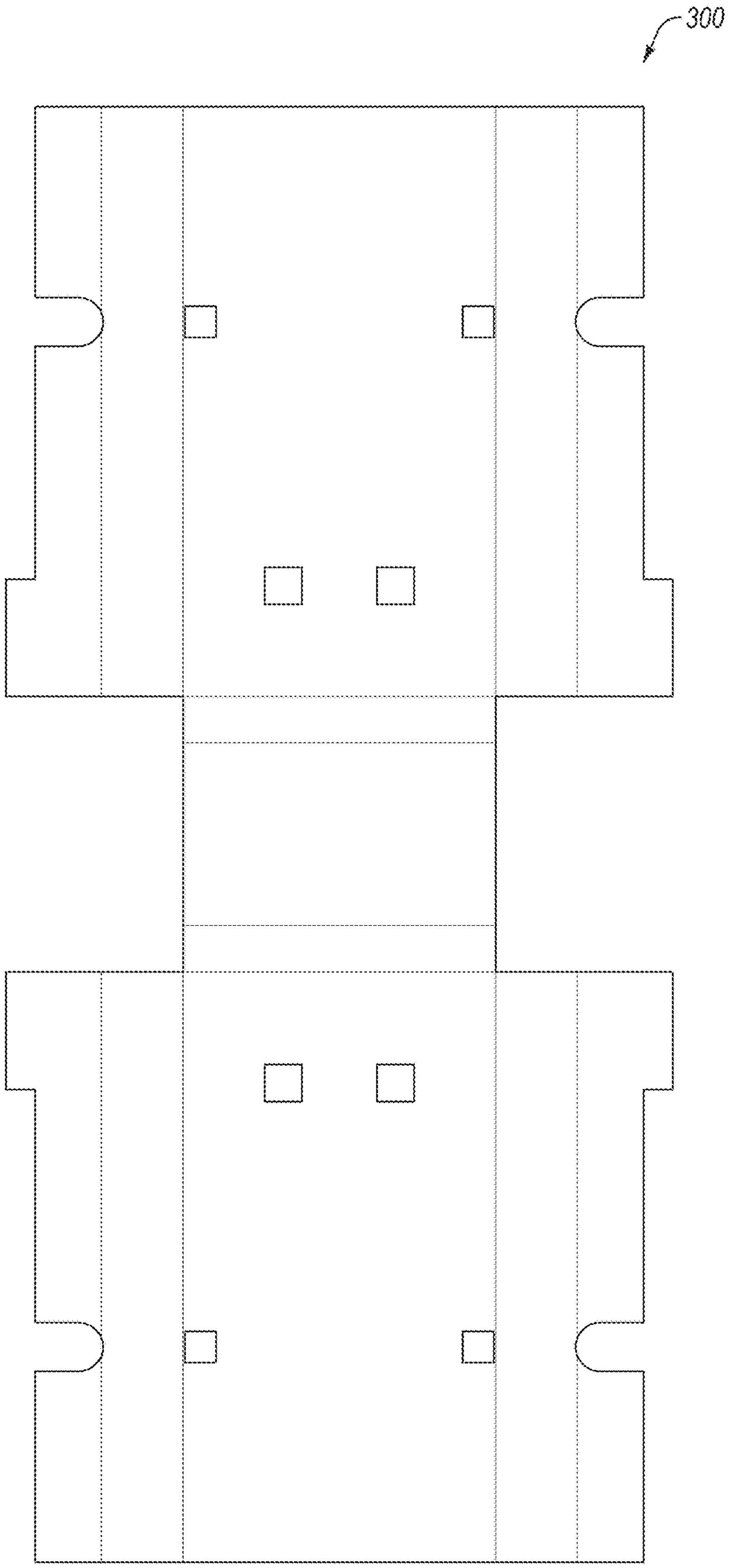

FIGS. 3A-3C illustrate another embodiment of an adapter clamp 300 for facilitating installation of PV components to a cylindrical pile according to the present disclosure. The adapter clamp 300 is similar to the adapter clamp 200 in that it includes first and second arms 304*a* and 304*b* that extend down at least a portion of opposing lateral sides of a cylindrical pile (not shown). The first and second arms 304*a* and 304*b* each include a mounting surface 308*a* and 308*b* (308*b* is not shown) for coupling PV components. Unlike the adapter clamp 200, the adapter clamp 300 includes a single top surface 306 that connects the first arm 304*a* to the second arm 304*b*.

The first arm 304*a* includes a first edge 310*a* and a second edge (not shown) that are curved inward toward the cylindrical pile 102. The first and second edges are machined or cut edges and interface with the outer surface of a cylindrical pile to create Hertzian contacts. The second arm 304*b* includes a third edge 310*b* and a fourth edge (not shown) that are also curved inward toward the cylindrical pile. These first, second, third, and fourth edges are machined or cut edges and interface with the outer surface of the cylindrical pile to create Hertzian contacts. The Hertzian contacts are substantially linear on the cylindrical pile.

Top portions of the first, second, third, and fourth edges also include vertical stops 330*a* and 330*b*. The vertical stops 330*a* and 330*b* extend more inward than the first, second, third, and fourth edges such that during installation, a cylindrical pile cannot extend beyond the vertical stops 330*a* and 330*b*. During installation, when the adapter clamp 300 is positioned over a cylindrical pile, the vertical stops 330*a* and 330*b* will make contact with a top surface of the cylindrical pile to prevent the adapter clamp from additional downward movement on the pile. In some embodiments, the vertical stops 330*a* and 330*b* may prevent the adapter clamp 300 from being positioned on a cylindrical pile in a way that the pile would interfere with components required to mount the adapter clamp 300 to one or more PV components. Thus, in these embodiments, the vertical stops 330*a* and 330*b* may be positioned laterally proximate to the mounting surfaces 308*a* and 308*b*.

The mounting surfaces 308*a* and 308*b* include holes 320 through which screws, bolts, or another fastening mechanism may be used to secure a PV component to the adapter clamp 300. The adapter clamp 300 also includes holes 322 through which screws, bolts, or another fastening mechanism may be used to secure the adapter clamp 300 to a cylindrical pile. Tightening the screws, bolts, or other fastening mechanism within the holes 322 will decrease a distance between the first arm 304*a* and the second arm 304*b* thereby increasing the pressure applied by edges 310 to the pile at the Hertzian contacts and strengthening the frictional attachment to the pile.

In some embodiments, the adapter clamp 300 may be made from a single unitary piece of metal. FIG. 3C illustrates the adapter clamp 300 in a flat state prior to folding and bending to create the final clamp.

Figure 4A:
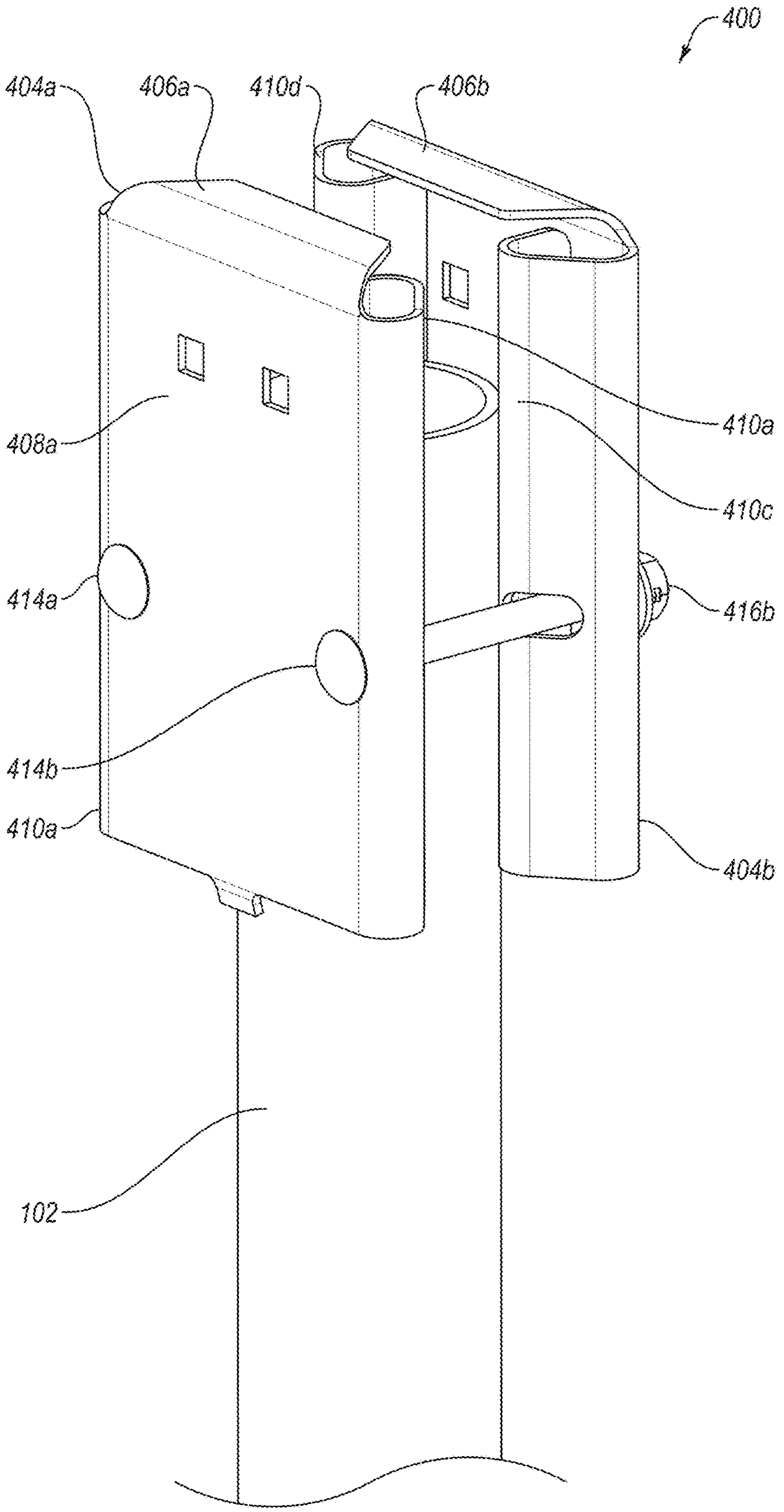
FIGS. 4A-4E illustrate another embodiment of an adapter clamp for facilitating installation of PV components to a cylindrical pile according to the present disclosure.
Figure 4B:
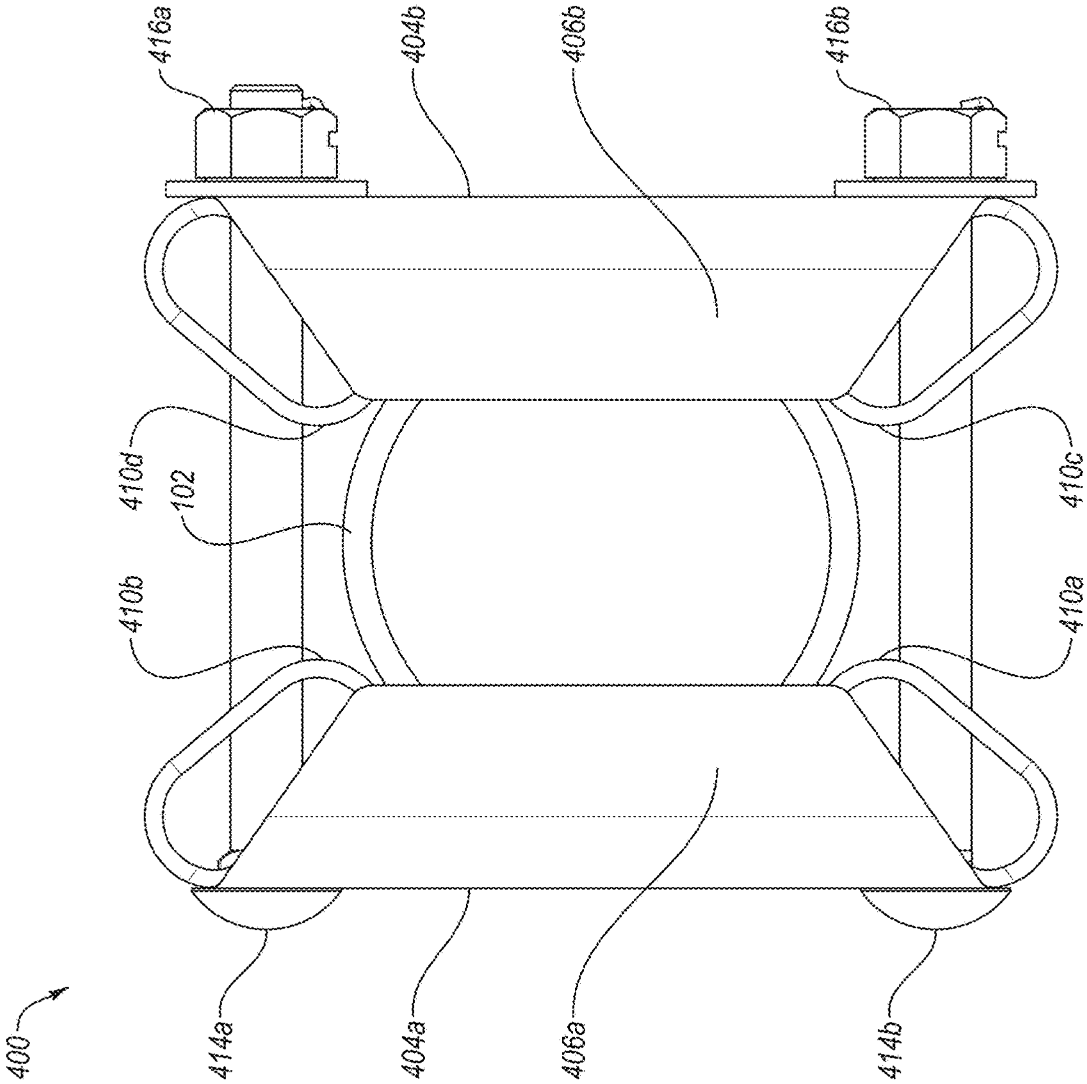
Figure 4E:
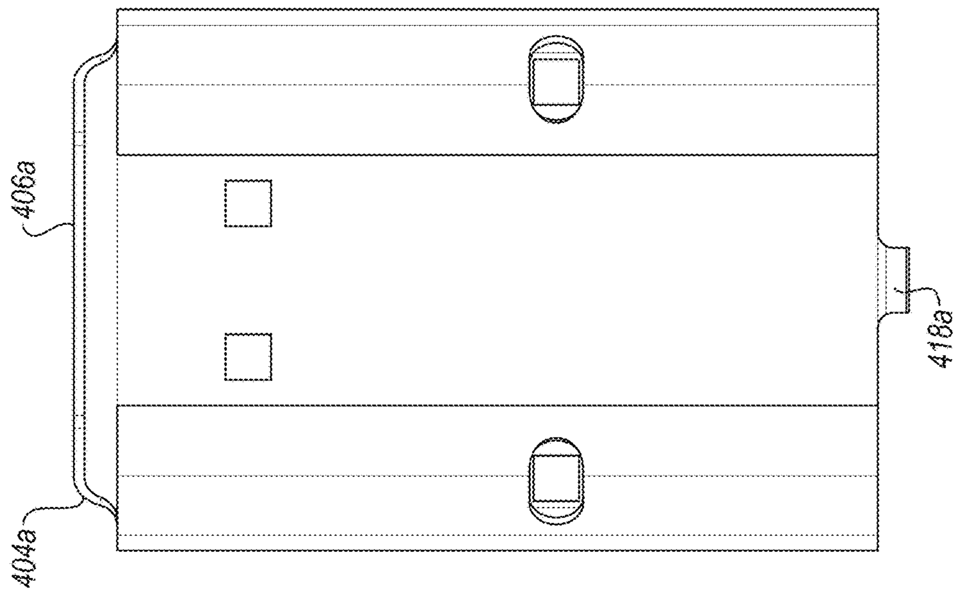
Figure 4D:
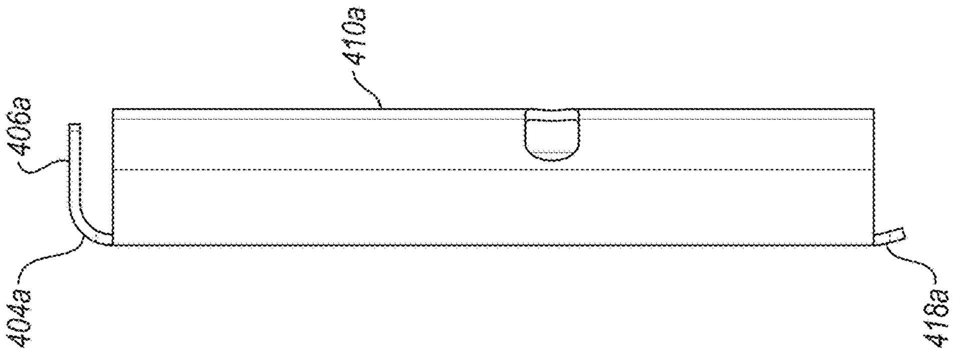
Figure 4C:
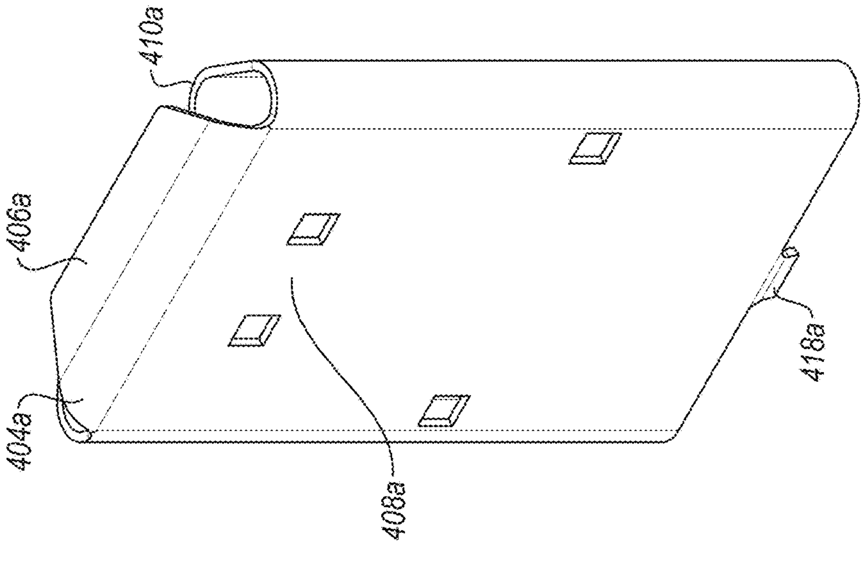

FIGS. 4A-4E illustrate another embodiment of an adapter clamp 400 for facilitating installation of PV components to the cylindrical pile 102 according to the present disclosure. FIG. 4A illustrates a perspective view of the adapter clamp 400 mounted to the cylindrical pile 102. FIG. 4B illustrates a top down view of the adapter clamp 400 and the cylindrical pile 102. FIGS. 4C-4E illustrate additional views of one arm of the adapter clamp 400.

The adapter clamp 400 includes a first arm 404*a* and a second arm 404*b*. The first and second arms 404*a* and 404*b* extend down at least a portion of opposing lateral sides of the cylindrical pile 102. The first and second arms 404*a* and 404*b* may be identical or substantially identical to each other. For example, the first and second arms 404*a* and 404*b* each include a top surface 406*a* and 406*b*. The first and second arms 404*a* and 404*b* each include a mounting surface 408*a* and 408*b* for coupling PV components. The mounting surfaces 408*a* and 408*b* may include holes or other features that facilitate the mounting of additional components, such as the brackets 110 and 160 illustrated in FIGS. 1A and 1B.

The first arm 404*a* includes a first edge 410*a* and a second edge 410*b* that are curved inward toward the cylindrical pile 102. The first and second edges 410*a* and 410*b* are curved or U-shaped edges and interface with the outer surface of the cylindrical pile 102 to create Hertzian contacts with the cylindrical pile 102. The second arm 404*b* includes a third edge 410*c* and a fourth edge 410*d* that are also curved inward toward the cylindrical pile 102. The second and third edges 410*c* and 410*d* are curved or U-shaped and interface with the outer surface of the cylindrical pile 102 to create Hertzian contacts with the cylindrical pile 102. The Hertzian contacts created between the edges 410*a*-410*d* and the cylindrical pile 102 are substantially linear.

Pressure or force applied by the first, second, third, and fourth edges 410*a*, 410*b*, 410*c*, and 410*d* to the outer surface of the cylindrical pile 102 at the Hertzian contacts with the cylindrical pile 102 create a frictional attachment between the first and second arms 404*a* and 404*b* and the cylindrical pile 102. The pressure required to create this frictional attachment may be generated by bolts 414*a* and 414*b* and associated nuts 416*a* and 416*b*. The bolts may pass through holes or recesses in the first and second arms 404*a* and 404*b*.

As the nuts 416*a* and 416*b* are tightened on the bolts 414*a* and 414*b*, a distance between the first and second arms 404*a* and 404*b* may be decreased to increase the strength of the frictional attachment to the cylindrical pile 102. In different embodiments, different fasteners may be used to secure the first and second arms 404*a* and 404*b* to the cylindrical piles. For example, in some embodiments a U-bolt may be used.

Because the attachment between the adapter clamp 400 and the cylindrical pile 102 does not use prescribed attachment locations, such as holes or other mounting features in the cylindrical pile 102, the adapter clamp 400 is versatile as it may be selectively positioned both vertically and rotationally on the cylindrical pile 102. This versatility may ensure that components secured to the cylindrical pile, such as torque tubes, are properly positioned and in proper alignment.

The first and second arms 404*a* and 404*b* also include vertical lock tabs 418*a* and 418*b*. The vertical lock tabs 418*a* and 418*b* are angled inward toward the cylindrical pile and positioned on the bottom of the first and second arms 404*a* and 404*b*. The vertical lock tabs 418*a* and 418*b* may further prevent movement of the adapter clamp 400 relative to the cylindrical pile 102.

Figure 5:
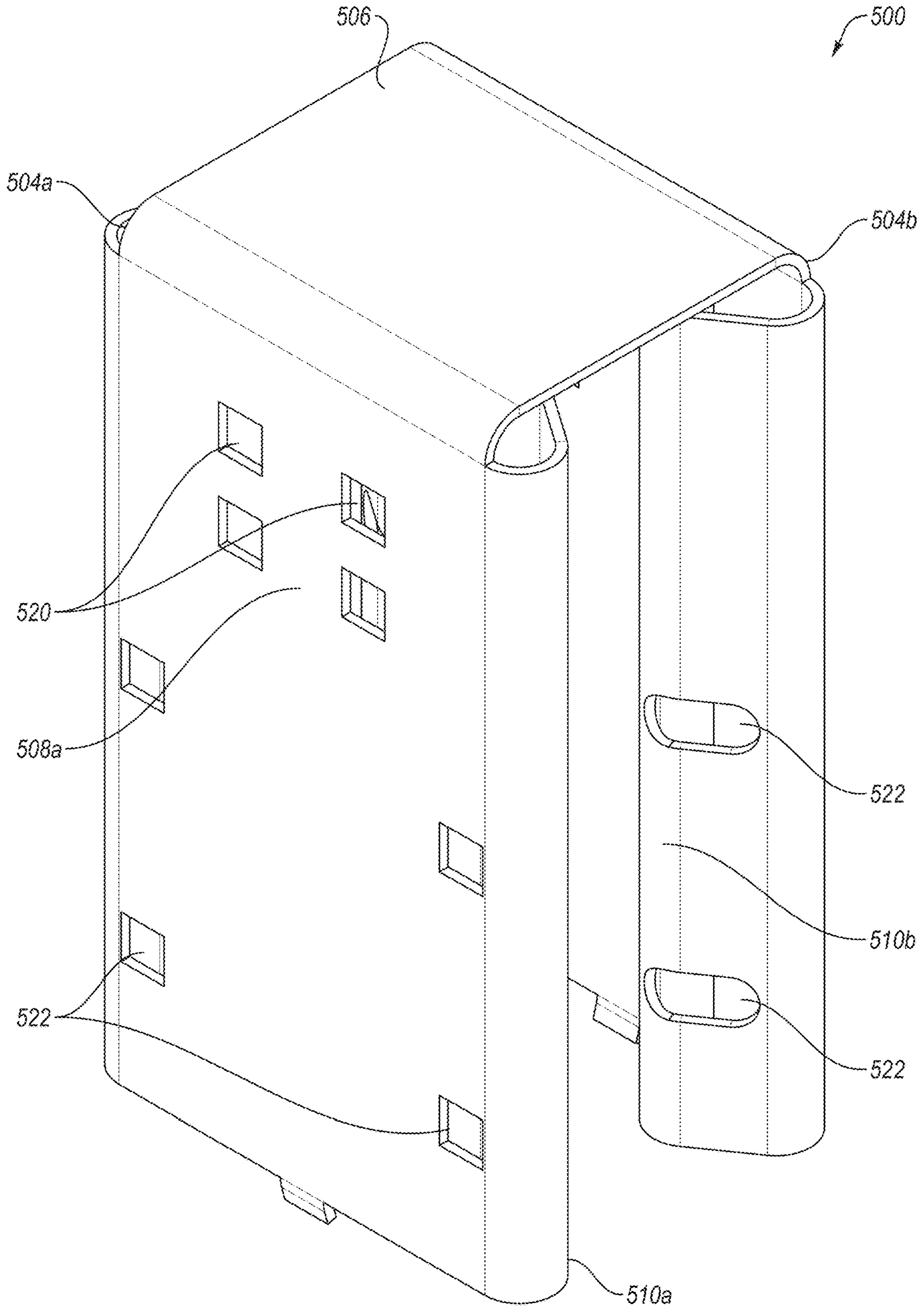
FIG. 5 illustrates another embodiment of an adapter clamp for facilitating installation of PV components to a cylindrical pile according to the present disclosure.

FIG. 5 illustrates another embodiment of an adapter clamp 500 for facilitating installation of PV components to a cylindrical pile according to the present disclosure. The adapter clamp 500 is similar to the adapter clamp 400 in that it includes first and second arms 504*a* and 504*b* that extend down at least a portion of opposing lateral sides of a cylindrical pile (not shown). The first and second arms 504*a* and 504*b* each include a mounting surface 508*a* and 508*b* (508*b* not shown) for coupling PV components. The adapter clamp 500 includes a single top surface 506 that connects the first arm 504*a* to the second arm 504*b*.

The first arm 504*a* includes a first edge 510*a* and a second edge (not shown) that are curved inward toward the cylindrical pile (not shown). The first and second edges are curved or U-shaped edges and interface with the outer surface of a cylindrical pile to create Hertzian contacts. The second arm 504*b* includes a third edge 510*b* and a fourth edge (not shown) that are also curved inward toward the cylindrical pile. The second and third edges are curved or U-shaped and interface with the outer surface of the cylindrical pile to create Hertzian contacts. These Hertzian contacts are substantially linear.

The mounting surfaces 508*a* and 508*b* include holes 520 through which screws, bolts, or another fastening mechanism may be used to secure a PV component to the adapter clamp 500. The adapter clamp 500 also includes holes 522 through which screws, bolts, or another fastening mechanism may be used to secure the adapter clamp 500 to the cylindrical pile. Tightening the screws, bolts, or other fastening mechanism within the holes 522 will decrease a distance between the first arm 504*a* and the second arm 504*b* thereby increasing the pressure applied by edges 510 to the pile at the Herzian contacts.

Figure 6A:
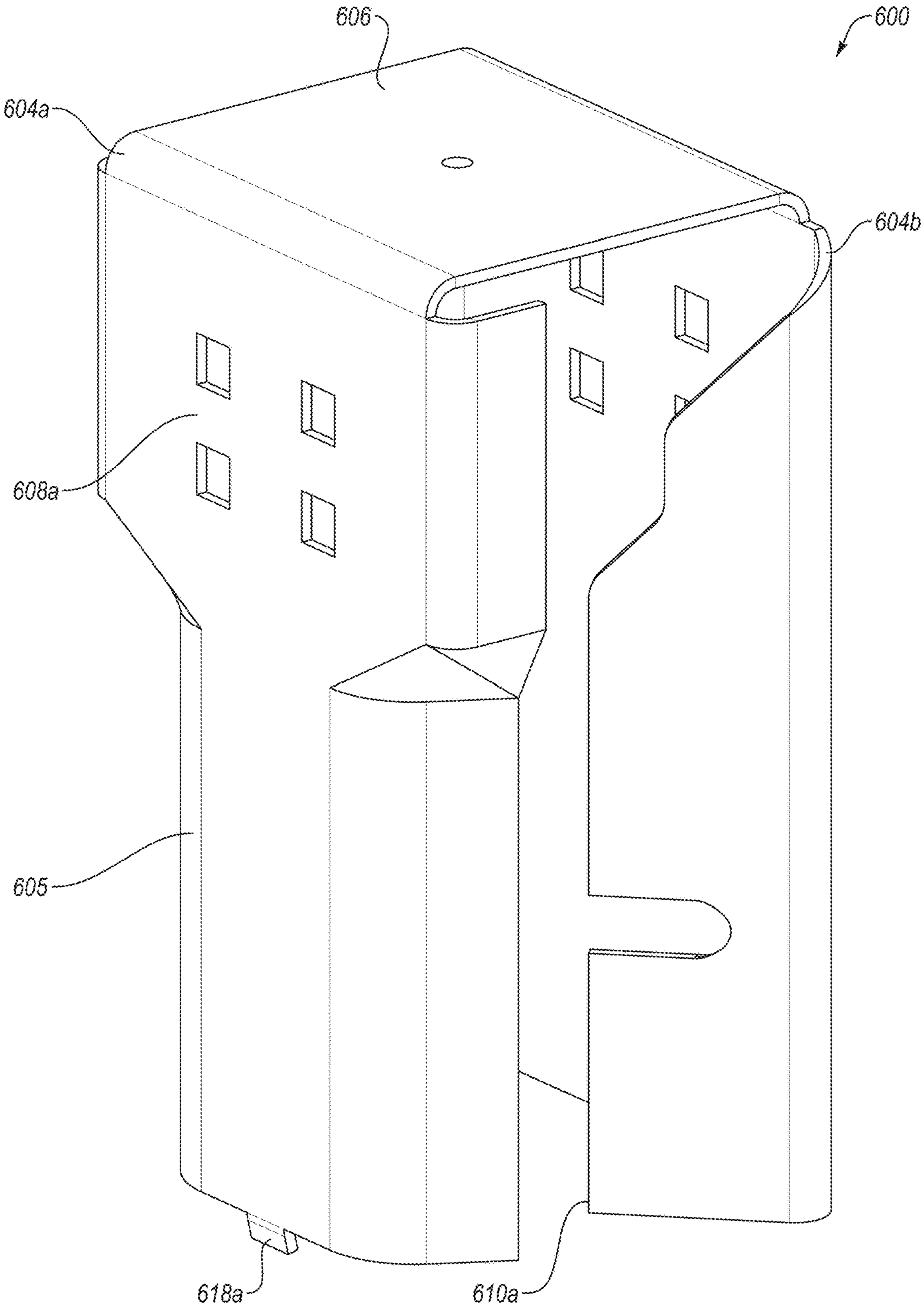
FIGS. 6A-6E illustrate another embodiment of an adapter clamp for facilitating installation of PV components to a cylindrical pile according to the present disclosure.
Figure 6B:
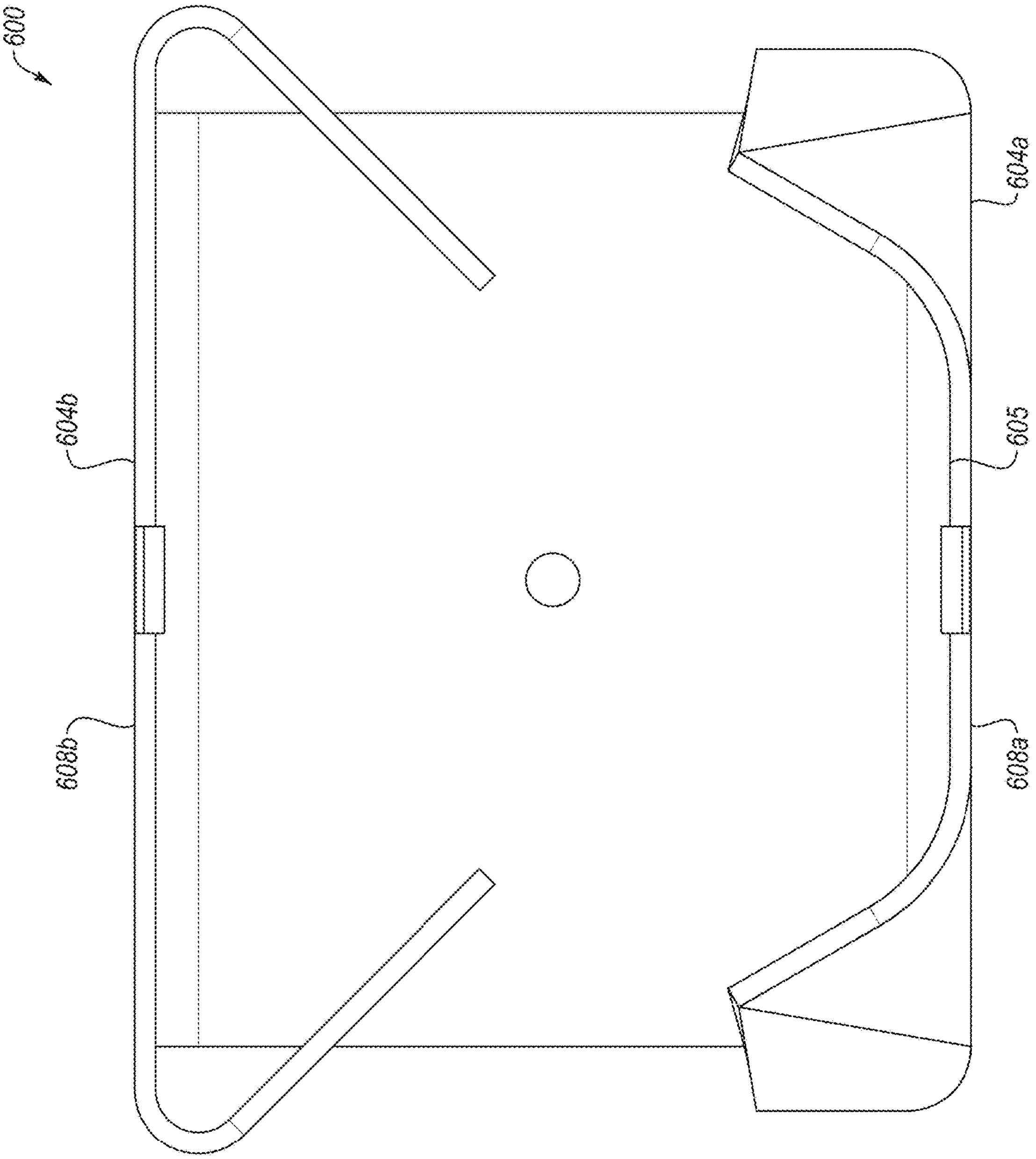
Figure 6E:
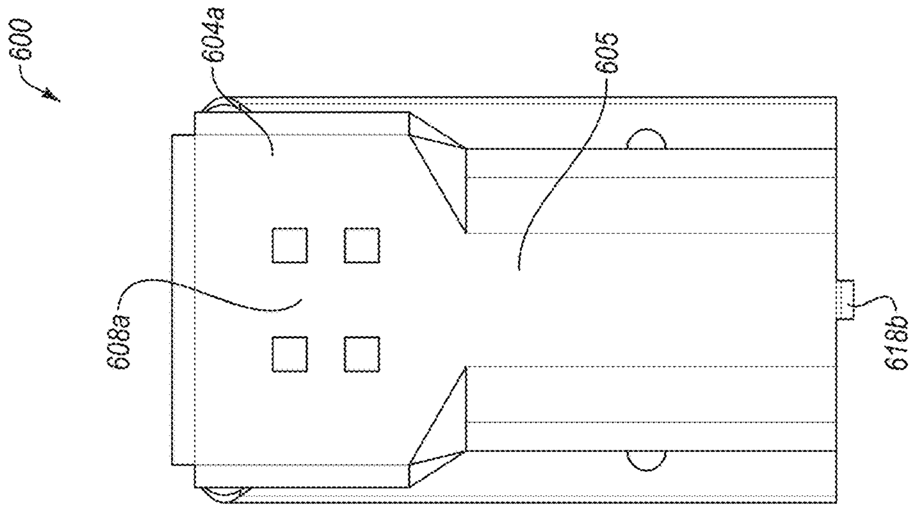
Figure 6D:
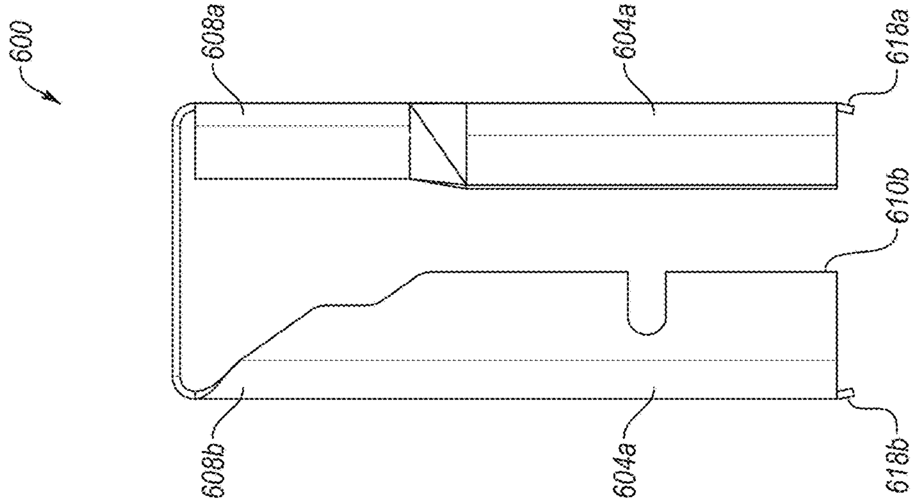
Figure 6C:
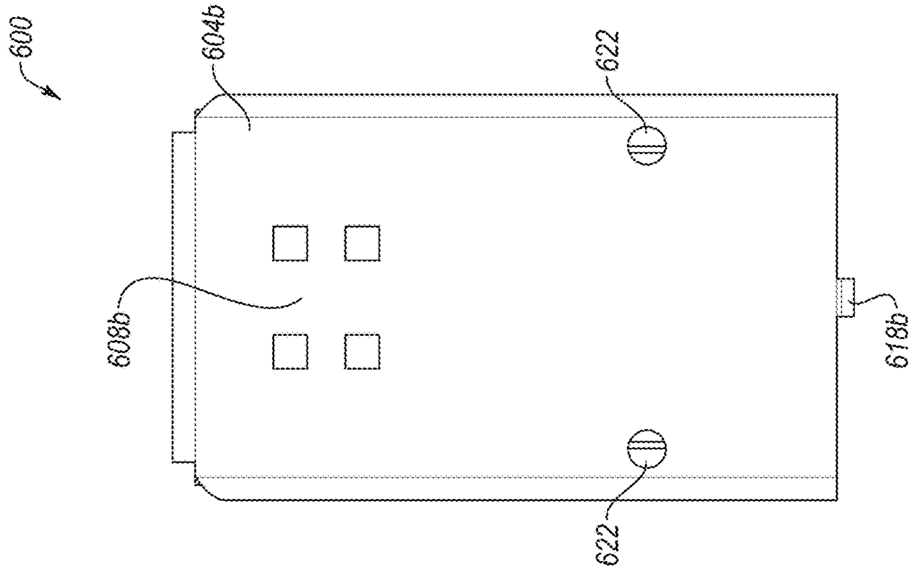

FIGS. 6A-6E illustrate another embodiment of an adapter clamp 600 for facilitating installation of PV components to the cylindrical pile (not shown) according to the present disclosure. FIG. 6A illustrates a perspective view of the adapter clamp 600. FIG. 6B illustrates a bottom up view of the adapter clamp 600. FIGS. 6C-6E illustrate additional views of the adapter clamp 600.

The adapter clamp 600 includes a first arm 604*a* and a second arm 604*b*. The first and second arms 604*a* and 604*b* are configured to extend down at least a portion of opposing lateral sides of a cylindrical pile. The first and second arms 604*a* and 604*b* are connected by a top surface 606. The first and second arms both include mounting surfaces 608*a* and 608*b* for coupling PV components. The mounting surfaces 608*a* and 608*b* may include holes or other features that facilitate the mounting of additional components, such as the brackets 110 and 160 illustrated in FIGS. 1A and 1B.

The portions of the first and second arms 604*a* and 604*b* that are configured to be secured to a cylindrical pile are asymmetrical. The first arm 604*a* has a curved portion 605 that is configured to surround a portion of an outer surface of the pile. All or part of an inner surface of the curved portion 605 contacts an outer surface of the cylindrical pile and creates a Hertzian contact at the locations of contact. The second arm 604*b* includes a first edge 610*a* and a second edge 610*b* that are curved inward toward the cylindrical pile 102. The first and second edges 610*a* and 610*b* cut or machined edges that interface with the outer surface of a cylindrical pile to create linear Hertzian contacts with the cylindrical pile.

Pressure or force applied by the inner surface of the curved portion 605 and the first and second edges 610*a* and 610*b* to the outer surface of the cylindrical pile create a frictional attachment between the first and second arms 604*a* and 604*b* and the cylindrical pile. The pressure required to create this frictional attachment may be generated by screws or bolts or another attachment mechanism. For example, a U-bolt may pass through holes 622 in the second arm 604*b* and around the curved portion 605 of the first arm 604*a* to decrease a distance between the first and second arms 604*a* and 604*b* and increase the strength of the frictional attachment to the cylindrical pile.

Because the attachment between the adapter clamp 600 and the cylindrical pile does not use prescribed attachment locations, such as holes in the cylindrical pile, the adapter clamp 600 is versatile as it may be selectively positioned both vertically and rotationally on the cylindrical pile. This versatility may ensure that components secured to the cylindrical pile, such as torque tubes, are in proper alignment.

The first and second arms 604*a* and 604*b* also include vertical lock tabs 618*a* and 618*b*. The vertical lock tabs 618*a* and 618*b* are angled inward toward the cylindrical pile and positioned on the bottom of the first and second arms 604*a* and 604*b*. The vertical lock tabs 618*a* and 618*b* may further prevent vertical movement of the adapter clamp 600 relative to the cylindrical pile.

Figure 7:
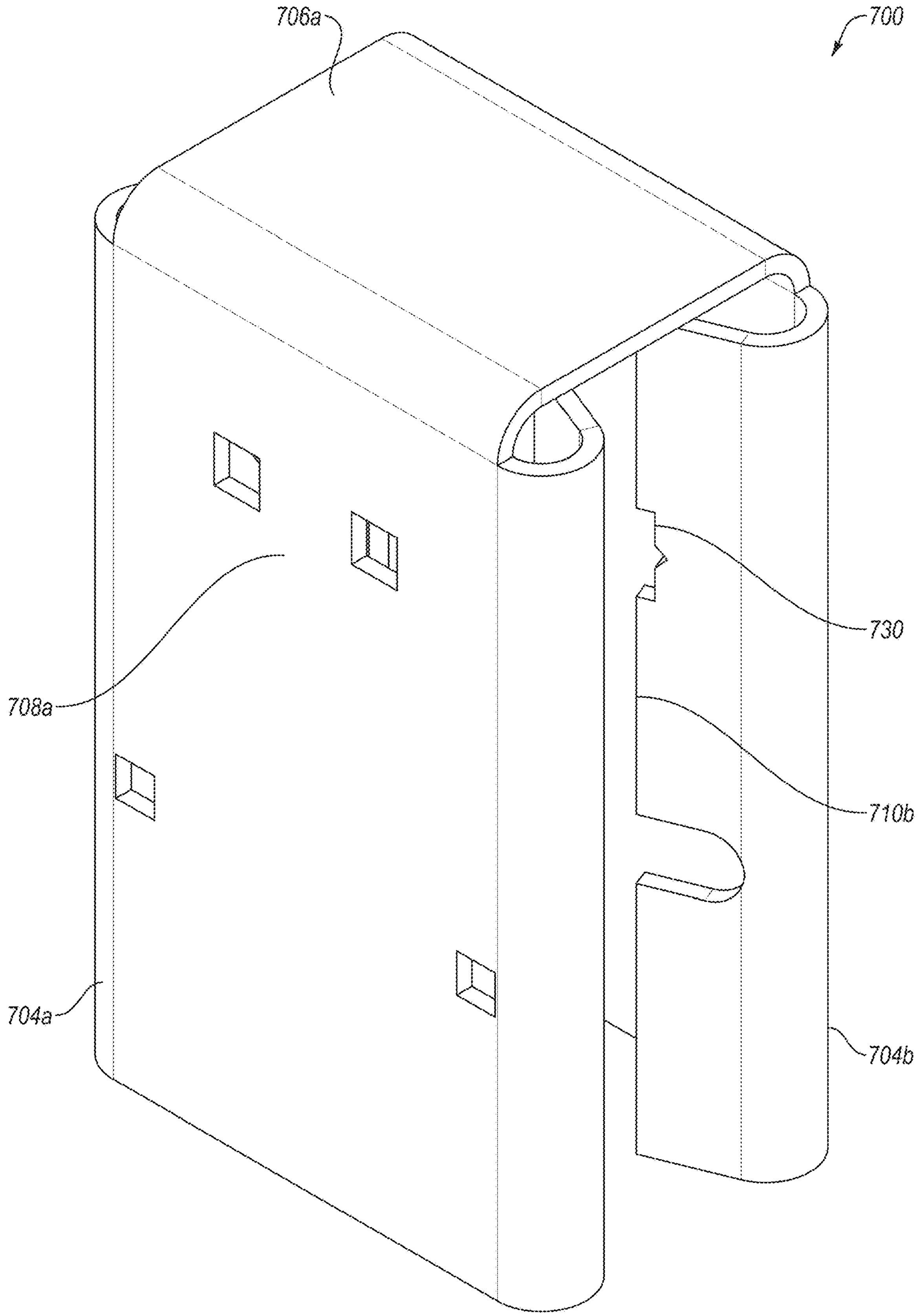
FIG. 7 illustrates another embodiment of an adapter clamp for facilitating installation of PV components to a cylindrical pile according to the present disclosure.

FIG. 7 illustrates another embodiment of an adapter clamp 500 for facilitating installation of PV components to a cylindrical pile according to the present disclosure. The adapter clamp 500 is similar to the adapter clamp 300 in that it includes first and second arms 704*a* and 704*b* that extend down at least a portion of opposing lateral sides of a cylindrical pile (not shown). The first and second arms 704*a* and 704*b* each include a mounting surface 708*a* and 708*b* (308*b* is not shown) for coupling PV components. Unlike the adapter clamp 300, the adapter clamp 700 lacks vertical stops. In addition, the adapter clamp 700 includes an alignment indicator 730.

In some embodiments, where the PV components to be secured to the adapter clamp 700 include a torque tube, there are certain tolerances in horizontal alignment that must be met. Tolerances for horizontal deviations may be indicated by the alignment indicator 730. An alignment indicator may have a length that indicates an amount of offset from horizontal that is allowable for a given torque tube.

The alignment indicator 730 has the appearance of a curly bracket that includes a point that indicates an ideal alignment. The portions of the alignment indicator 730 on either side of this point may provide allowable tolerances on either side of ideal. Thus, when a top surface of a cylindrical pile is positioned within the alignment indicator 730 (or at some point within the length of the alignment indicator 730), any torque tubes installed on the adapter clamp 500 will be within a range of allowable tolerances.

What is claimed is:

1. An adapter clamp for facilitating installation of photovoltaic (PV) components to a cylindrical pile, the adapter clamp comprising:

a first arm configured to be secured to a first side of the cylindrical pile, the first arm having a first edge that is configured to create a first Hertzian contact with an outer surface of the cylindrical pile, a second edge that is configured to create a second Hertzian contact with the outer surface of the cylindrical pile, and a first mounting surface configured for coupling a first PV component;

a second arm configured to be secured to a second side of the cylindrical pile, the second arm having a second mounting surface configured for coupling a second PV component;

a top surface that connects the first arm to the second arm, wherein the first arm, the second arm, and the top surface are integrally formed from a single sheet of metal; and a fastener configured to secure the first arm to the second arm and decrease a distance therebetween in order to create a frictional attachment between the first and second arms and the cylindrical pile.

2. The adapter clamp of claim 1, wherein the first and second mounting surfaces each define one or more mounting holes.

3. The adapter clamp of claim 1, wherein the first and second edges are machined edges.

4. The adapter clamp of claim 1, wherein the first and second edges are rounded edges.

5. The adapter clamp of claim 1, wherein the second arm includes a third edge that is configured to create a third Hertzian contact with the outer surface of the cylindrical pile and a fourth edge that is configured to create a fourth Hertzian contact with the outer surface of the cylindrical pile.

6. The adapter clamp of claim 1, wherein the fastener is a bolt.

7. The adapter clamp of claim 6, wherein the first and second arms each define at least one fastener hole.

8. The adapter clamp of claim 6, wherein the fastener is a U-bolt.

9. The adapter clamp of claim 1, wherein the second arm is curved such that an inner surface of the second arm is configured to create a third Hertzian contact with the outer surface of the cylindrical pile.

10. The adapter clamp of claim 1, wherein the first arm further includes a vertical locking tab.

11. The adapter clamp of claim 1, wherein the first and second arms are configured to ensure alignment on opposite sides of the cylindrical pile.

12. The adapter clamp of claim 1, wherein the first and second arms are configured to ensure that the first and second Hertzian contacts are approximately parallel with an axis of the cylindrical pile.

13. A solar installation system comprising:

a cylindrical pile having a round or oval cross sectional shape; and an adapter clamp comprising:

a first arm secured to a first side of the cylindrical pile, the first arm having a first edge that creates a first Hertzian contact with an outer surface of the cylindrical pile, a second edge that creates a second Hertzian contact with the outer surface of the cylindrical pile, and a first mounting surface configured for coupling a first PV component;

a second arm secured to a second side of the cylindrical pile, the second arm having a second mounting surface configured for coupling a second PV component;

a top surface that connects the first arm to the second arm, wherein the first arm, the second arm, and the top surface are integrally formed from a single sheet of metal; and a fastener that secures the first arm to the second arm decreases a distance therebetween in order to create a frictional attachment between the first and second arms and the cylindrical pile.

14. The system of claim 13, wherein the first and second edges of the adapter clamp are machined edges.

15. The system of claim 13, wherein the first and second edges of the adapter clamp are rounded edges.

16. The system of claim 13, wherein the second arm includes a third edge that is configured to create a third Hertzian contact with the outer surface of the cylindrical pile and a fourth edge that is configured to create a fourth Hertzian contact with the outer surface of the cylindrical pile.

17. The system of claim 13, wherein the fastener is a bolt.

18. The system of claim 17, wherein the first and second arms each define at least one fastener hole.

19. The system of claim 17, wherein the fastener is a U-bolt.

20. The system of claim 13, wherein the first arm further includes a vertical locking tab.

* * * * *